United States Patent
Sasaki et al.

(10) Patent No.: US 8,827,731 B2
(45) Date of Patent: Sep. 9, 2014

(54) INLET ASSEMBLY

(75) Inventors: Masaru Sasaki, Toyota (JP); Daisuke Sugiyama, Toyota (JP); Hirotaka Fukushima, Makinohara (JP); Shigeo Mori, Makinohara (JP); Kenya Takahashi, Makinohara (JP)

(73) Assignees: Toyota Jidosha Kabushiki Kaisha, Toyota (JP); Yazaki Corporation, Tokyo (JP)

( * ) Notice: Subject to any disclaimer, the term of this patent is extended or adjusted under 35 U.S.C. 154(b) by 28 days.

(21) Appl. No.: 13/580,511

(22) PCT Filed: Feb. 22, 2011

(86) PCT No.: PCT/IB2011/000357
§ 371 (c)(1),
(2), (4) Date: Nov. 30, 2012

(87) PCT Pub. No.: WO2011/104609
PCT Pub. Date: Sep. 1, 2011

(65) Prior Publication Data
US 2013/0078846 A1    Mar. 28, 2013

(30) Foreign Application Priority Data
Feb. 23, 2010   (JP) .................................. 2010-037363

(51) Int. Cl.
*H01R 12/00*    (2006.01)
(52) U.S. Cl.
USPC ............................................ 439/206; 439/34
(58) Field of Classification Search
USPC .................... 439/310, 34, 205, 206
See application file for complete search history.

(56) References Cited

U.S. PATENT DOCUMENTS

| 4,793,819 | A | * | 12/1988 | Berg ............................ 439/142 |
| 5,769,660 | A | | 6/1998 | Sakurai et al. |
| 5,921,803 | A | | 7/1999 | Mori |
| 6,123,569 | A | | 9/2000 | Fukushima et al. |
| 6,774,309 | B2 | * | 8/2004 | Kasai ............................. 174/66 |
| 7,258,559 | B2 | * | 8/2007 | Mattern et al. ............... 439/248 |
| 7,549,873 | B2 | * | 6/2009 | Hayakawa et al. ......... 439/76.2 |
| 2004/0214458 | A1 | | 10/2004 | Maebashi |
| 2005/0178576 | A1 | | 8/2005 | Saka et al. |

FOREIGN PATENT DOCUMENTS

| CN | 2502315 Y | 7/2002 |
| DE | 19650097 A1 | 6/1997 |
| JP | 63-180367 U | 11/1988 |
| JP | 1-69311 U | 9/1989 |
| JP | 7-29631 A | 1/1995 |
| JP | 7-122328 A | 5/1995 |
| JP | 07-179149 A | 7/1995 |

(Continued)

OTHER PUBLICATIONS

May 8, 2011 Search Report issued in International Patent Application No. PCT/IB2011/000357.

(Continued)

*Primary Examiner* — Gary Paumen
(74) *Attorney, Agent, or Firm* — Oliff PLC

(57) ABSTRACT

A drainage inducing member that promotes drainage is arranged on an edge portion on the back side of a drain hole provided in an inlet base of an inlet assembly, in order to better promote the drainage of water that has reached the drain hole to the outside.

3 Claims, 4 Drawing Sheets

(56) References Cited

FOREIGN PATENT DOCUMENTS

| | | |
|---|---|---|
| JP | 07-192826 A | 7/1995 |
| JP | 9-161884 A | 6/1997 |
| JP | 9-204952 A | 8/1997 |
| JP | 10-321294 A | 12/1998 |
| JP | 3093018 U | 4/2003 |
| JP | 2003-200936 A | 7/2003 |
| JP | 2006-339114 A | 12/2006 |

OTHER PUBLICATIONS

May 8, 2011 Written Opinion issued in International Patent Application No. PCT/IB2011/000357.

Partial English Translation of May 16, 2014 Office Action issued in Chinese Application No. 201180010744.6.

* cited by examiner

INLET ASSEMBLY

BACKGROUND OF THE INVENTION

1. Field of the Invention

The invention relates to the structure of an inlet assembly that includes an inlet to which a connector that is connected to an external power supply connects.

2. Description of the Related Art

A vehicle that runs by driving a motor with electric power stored in a power storage device, such as an electric vehicle or a hybrid vehicle (HV), that will hereinafter simply be referred to as an "electric vehicle", has been put into practical use. Also in recent years, progress has also been made with the development of a so-called plug-in vehicle (PHV) that is provided with a system that charges a power storage device with electric power supplied from an external power supply referred to as a charging stand or the like.

In such a plug-in vehicle, a charging inlet for connecting a charge connector is provided on the side of the vehicle (such as on a front left fender of the vehicle). One end of the charge connector is connected to a commercial power supply or the like. The connector remains connected to the charge inlet of the vehicle in a driveway or a parking lot, for example, for a fixed period of time.

The connector remains connected to the inlet in order to perform charging. In this case, in cold areas or in winter, it is possible that rainwater or water adhered by spattered mud or the like may freeze on the inlet assembly that includes the inlet or on the connector, such that the connector is unable to be disconnected from the inlet. Also, water adhered onto the inlet assembly may freeze, thereby preventing the connecter from being able to be connected to the inlet.

Incidentally, Japanese Patent Application Publication No. 07-192826 (JP-A-07-192826) relates to an electric vehicle charge connector, and describes an electric vehicle that includes a structure that enables charging to be performed to a charging apparatus mounted in the vehicle using an external power supply. Japanese Patent Application Publication No. 2003-200936 (JP-A-2003-200936) relates to the shape of a drain hole of a container, and describes technology that prevents a water film over a drain hole, by slanting the side surface on the outside of the drain hole. Japanese Patent Application Publication No. 07-179149 (JP-A-07-179149) relates to a drainage structure of a stay of a vehicle door mirror, and describes technology that improves the drainage effect by incrementally making the diameter of a drain hole smaller.

SUMMARY OF THE INVENTION

The invention thus provides an inlet assembly that has a structure that promotes the drainage of water that has adhered to the inlet assembly to the outside.

One aspect of the invention relates to an inlet assembly provided in a vehicle in which a power storage device mounted inside is charged using an external power supply. This inlet assembly includes an inlet to which a connector that is connected to the external power supply connects, an inlet base that secures the inlet to the vehicle, and a cylindrical guide wall that surrounds the inlet and guides the connector into connection with the inlet. A drain hole is provided in the inlet base, and a drainage inducing member that promotes drainage is arranged on an edge portion of the drain hole, on a back side of the inlet base, the back side being a side opposite the side on which the inlet is provided.

In the structure described above, at least two of the drain holes may be provided in the inlet base, a respective one of the drainage inducing members may be provided for a respective one of the drain holes, and the inlet assembly may also include a collective drainage member that collects water drained from the drainage inducing members in a single location and drains the water.

In the structure described above, a grommet that covers a cable that is connected to the inlet may be provided on the back side of the inlet base, and the collective drainage member may be provided on the grommet.

According to the inlet assembly of the invention, it is possible to provide an inlet assembly that has a structure that promotes the drainage of water that has adhered to the inlet assembly to the outside.

BRIEF DESCRIPTION OF THE DRAWINGS

The features, advantages, and technical and industrial significance of this invention will be described in the following detailed description of example embodiments of the invention with reference to the accompanying drawings, in which like numerals denote like elements, and wherein.

DETAILED DESCRIPTION OF EMBODIMENTS

Figure 1:
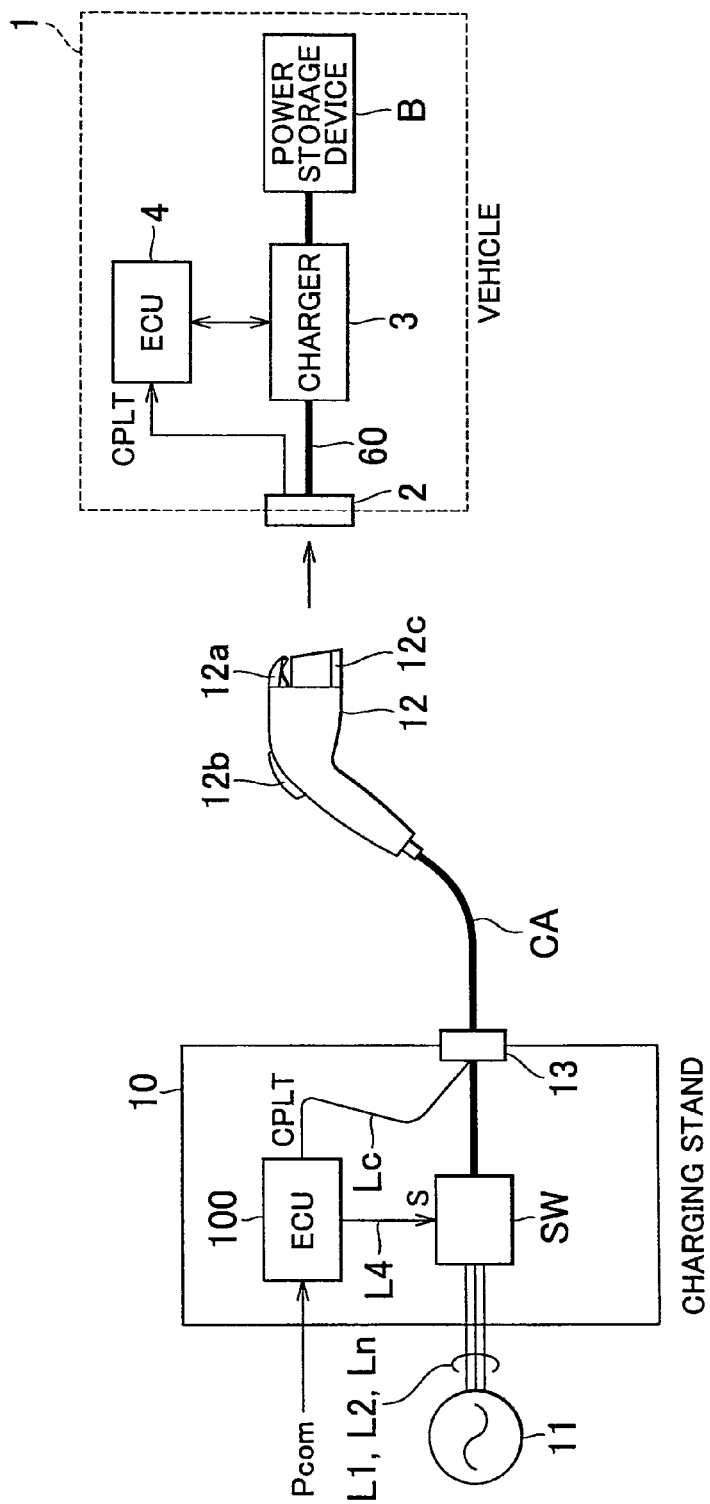
FIG. 1 is a diagram of a charging stand and a vehicle provided with an inlet assembly according to an example embodiment of the invention.

An inlet assembly according to an example embodiment of the invention will now be described with reference to the accompanying drawings. Incidentally, in the example embodiment described below, when reference is made to a number or an amount or the like, the invention is not limited to this number or amount or the like unless specifically noted. Also, like or corresponding parts will be denoted by like reference characters and redundant descriptions will not be repeated.

FIG. 1 is a diagram of a charging stand and a vehicle provided with an inlet assembly according to an example embodiment of the invention. The charging stand 10 is an alternating current (AC) power supply provided especially for charging a charger 3 mounted in an electric vehicle such as a vehicle 1. Incidentally, the charging stand 10 may also be a direct current (DC) power supply.

The vehicle 1 is an electric vehicle that runs by driving a motor, not shown, using electric power in the charger 3. The vehicle 1 may be an electric vehicle provided with only a motor as a driving source, or a hybrid vehicle provided with both a motor and an engine.

The vehicle 1 is a so-called plug-in vehicle, and has a charging system for charging a power storage device B with alternating current (AC) power supplied from the external charging stand 10. This charging system includes an inlet 2, the to charger 3, and an ECU 4. The inlet 2 is configured to be able to connect to a connector 12 of a charge cable CA that extends from the charging stand 10. In response to a control signal from the ECU 4, the charger 3 converts AC power supplied from the charging stand 10 to DC power that can be charged to the power storage device B, and supplies this DC power to the power storage device B.

When the connector 12 of the charge cable CA is connected to the inlet 2 of the vehicle 1, a pilot signal CPLT (described later) that is generated by an ECU 100 of the charging stand 10 is input to the ECU 4 via the charge cable CA and the inlet 2. The ECU 4 performs charging control of the power storage device B by controlling the charger 3 based on information such as the pilot signal CPLT.

Meanwhile, the charging stand 10 includes a commercial power supply 11, a switch SW, the charge cable CA, and the ECU 100. The commercial power supply 11 is a so-called single phase three-wire type alternating current power supply that is widely used in Japan for example.

The charge cable CA is connected at one end portion to the switch SW via a connecting portion 13, and is connected at the other end portion to the connector 12. The connector 12 is a connector that is configured to be able to be connected to the inlet 2 of the vehicle 1. Incidentally, the connecting portion 13 may be formed by a connector and be able to disconnect the charge cable CA from the charging stand 10.

Figure 2:
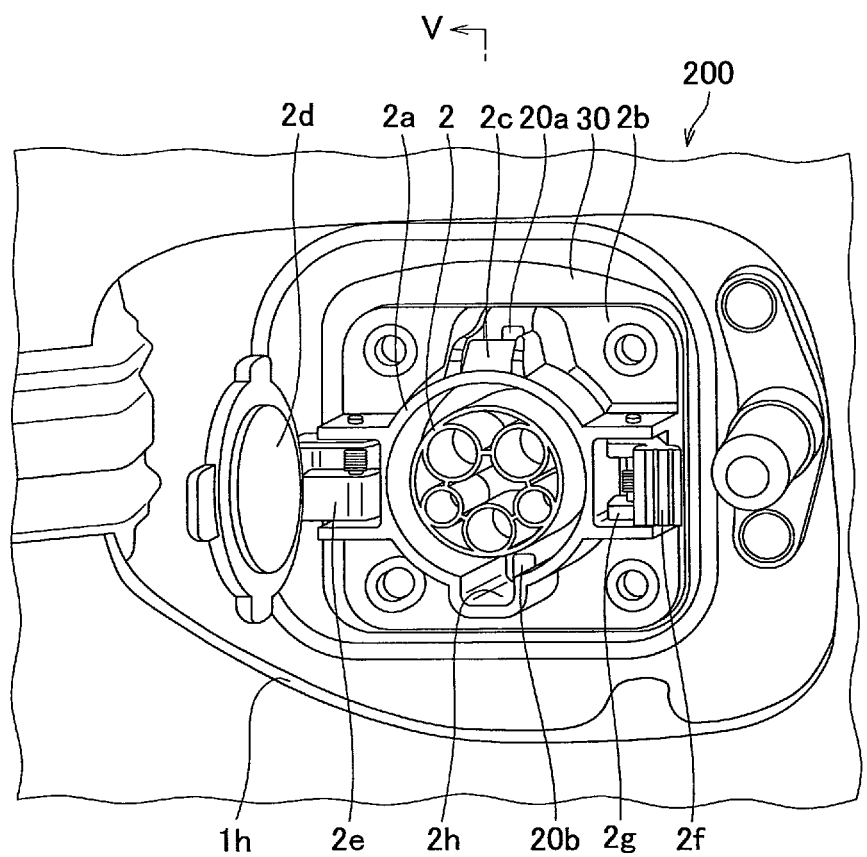
FIG. 2 is a front view of the inlet assembly according to the example embodiment.

Next, the structure of an inlet assembly 200 according to this example embodiment will be described with reference to FIG. 2. As an example, this inlet assembly 200 is housed in an inlet opening 1h provided in the side of the vehicle 1 (such as a front left fender of the vehicle). The inlet opening 1h can be opened and closed by a cover 1c (see FIG. 5).

The inlet assembly 200 includes the inlet 2 to which the connector 12 connects, an inlet base 2b that secures this inlet 2 to the vehicle 1, and a cylindrical guide wall 2a that surrounds the inlet 2 and guides the connector 12 into connection with the inlet 2. In this example embodiment, the inlet 2, the inlet base 2b, and the guide wall 2a are integrally molded by a resin molded component.

A lock wall 2c is provided on an outer periphery upper end surface of the cylindrical guide wall 2a, and a lock pin 12a (see FIG. 1) that is able to engage with this lock wall 2c is provided on the connector 12 side. Also, a positioning groove 2h into which a positioning wall 12c that is provided on the connector 12 side (see FIG. 1) fits is provided in a lower end surface of the cylindrical guide wall 2a.

When plugging the connector 12 into the inlet 2, the lock pin 12a rides over the lock wall 2c by the connector 12 being pushed in while the positioning wall 12c provided on the connector 12 side is fitted into the positioning groove 2h. This secures the connection between the inlet 2 and the connector 12.

When unplugging the connector 12 from the inlet 2, the lock pin 12a is disengaged from the lock wall 2c, thereby enabling the connector 12 to be unplugged from the inlet 2, by pushing in an unlock button 12b provided on the connector 12 side.

The inlet assembly 200 includes an inlet cover 2d that protects the inlet 2. This inlet cover 2d is connected to the guide wall 2a by a cover hinge 2e so as to be able to open and close. Also, a lock lever 2f that secures the inlet cover 2d closed is provided. This lock lever 2f is also rotatably connected to the guide wall 2a by a lock lever hinge 2g.

An inlet shield 30 that prevents water and the like from getting into the vehicle body from the outside, as well as serves as a screen, is provided on the back side (i.e., the inside of the vehicle 1) of the inlet base 2b, i.e., the side of the inlet base 2b that is opposite the side on which the inlet 2 is provided. A peripheral edge portion of this inlet shield 30 is provided standing upright facing the outside of the vehicle and surrounding the periphery of the inlet assembly 200. Bendable material formed of rubber or elastomer or the like is used for this inlet shield 30.

Figure 3:
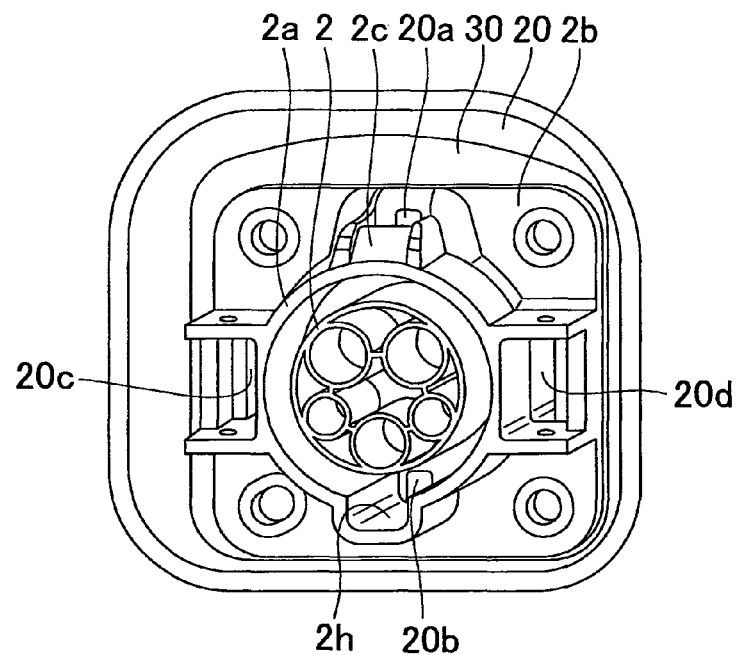
FIG. 3 is an enlarged front view of the inlet assembly according to the example embodiment.

Next, drain holes provided in the inlet assembly 200 will be described with reference to FIG. 3. To simplify the description, the inlet assembly 200 is shown without the inlet cover 2d, the cover hinge 2e, the lock lever 2f, and the lock lever hinge 2g in FIG. 3.

Drain holes for draining water that has adhered to the surface on the back side are provided in this inlet assembly 200. More specifically, a drain hole 20a is provided on the back side of the lock wall 2c, a drain hole 20b is provided on the back side of the positioning groove 2h, a drain hole 20c is provided on the back side of the cover hinge 2e, and a drain hole 20d is provided on the back side of the lock lever hinge 2g.

All of these drain holes 20a to 20d are holes that extend through the inlet base 2b. The shapes of these drain holes 20a to 20d vary depending on the position in which they are provided. For example, they may be square, rectangular, circular, or oval. The opening area of each drain hole is approximately 10 mm$^2$ to approximately 100 mm$^2$.

The reason for providing the drain holes 20a to 20d in the positions described above is that because if water adheres and freezes in these areas, it may interfere with the plugging or unplugging of the connector 12, or interfere with the opening and closing of the inlet cover 2d. Accordingly, drain holes may also be provided in other areas where water, if frozen, may interfere with the unplugging of the connector 12.

Figure 4:
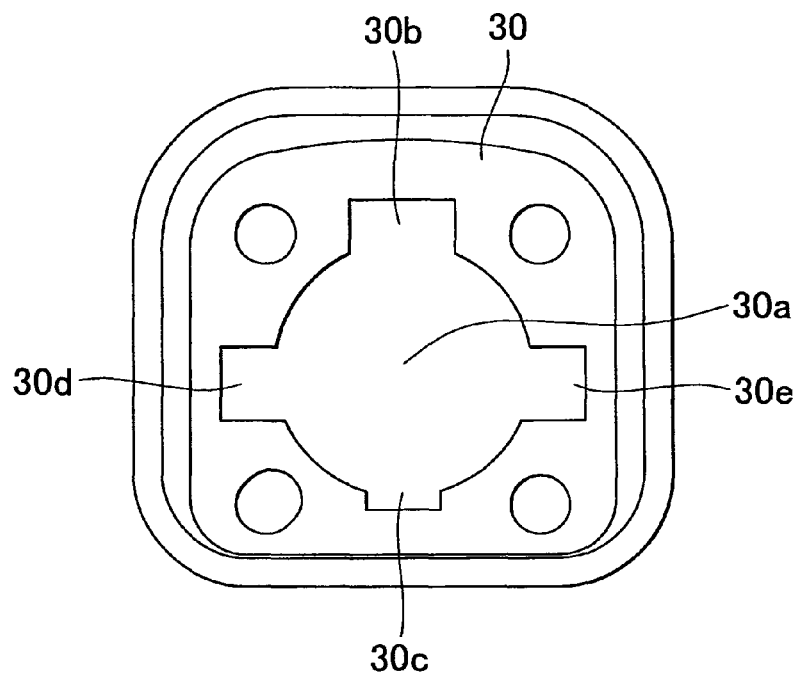
FIG. 4 is a plan view of an inlet shield according to the example embodiment.

Referring to FIG. 4, notched areas 30b to 30e are provided in a center open area 30a of the inlet shield 30 arranged on the back side of the inlet base 2b, so as not to block the drain holes 20a to 20d.

Figure 5:
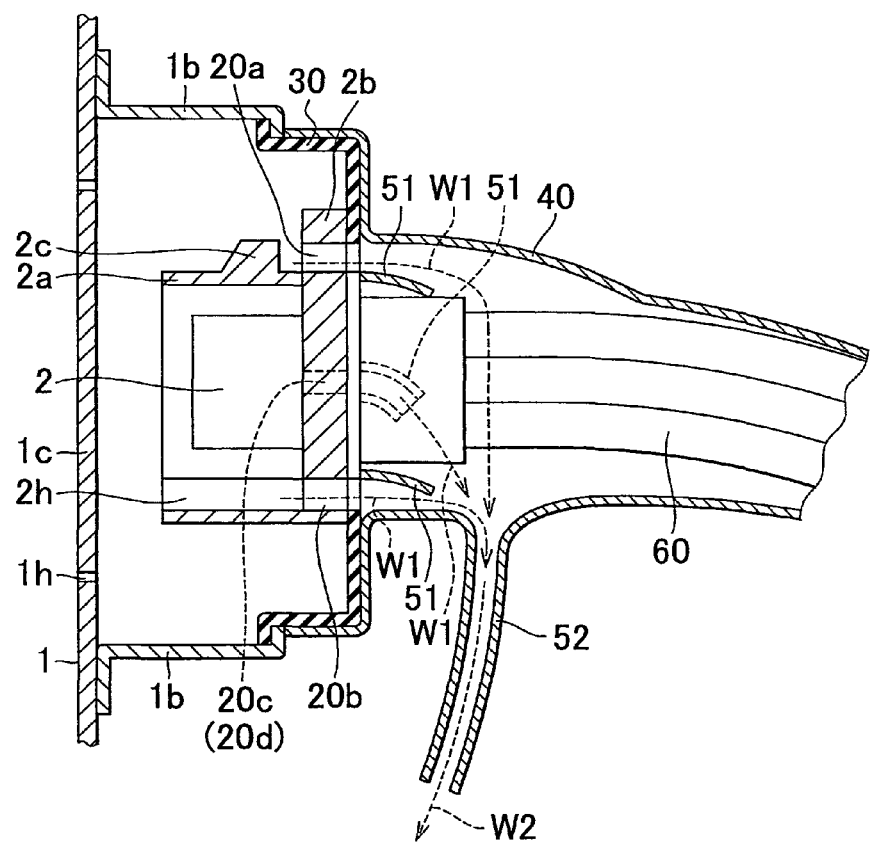
FIG. 5 is a sectional view taken along line V in FIG. 2.

Next, the structure of the back side of the drain holes 20a to 20d will be described with reference to FIG. 5. As shown in FIG. 5, the inlet assembly 200 is arranged housed in an inlet box 1b provided inside the vehicle 1, and the inlet shield 30 hides the inside of the vehicle 1 from view.

Also, a cable 60 that is connected to the inlet 2 is arranged on the back side of the inlet assembly 200. Also, a grommet 40 is arranged to protect the cable 60 and the back side of the inlet assembly 200. Bendable material formed of rubber or elastomer or the like is used for this grommet 40.

Here, the drain holes 20a to 20d are provided in the inlet assembly 200, so if a large amount of water has adhered, this water is easily drained through these drain holes 20a to 20d. However, if the amount of water is small, the drain holes 20a to 20d may become blocked due to the surface tension of the water, and as a result, the water may have difficulty draining.

Therefore, in this example embodiment, drainage inducing members 51 that promote draining are provided on the peripheral portions on the back side of the drain holes 20a to 20d to further promote the drainage of water that has reached the drain holes 20a to 20d to the outside. Providing these drainage inducing members 51 reduces the surface tension of the water at the drain holes 20a to 20d so that the water can be brought over to the side with the drainage inducing members 51. The drainage inducing members 51 are fixed to the back side of the inlet base 2b using an adhesive or the like, in positions on the edge portions of the drain holes 20a to 20d.

Bendable material formed of rubber or elastomer or the like may be used for the drainage inducing members 51. Also, the drainage inducing members 51 may be tongue-shaped or cylindrical or the like.

If the grommet 40 is not provided on the back side of the inlet assembly 200, water that is brought in by the drainage inducing members 51 will drain directly outside. However, if the grommet 40 is provided, water must be drained out of the grommet 40.

If a tube-shaped drainage inducing members 51 is provided for each drain hole 20a to 20d, the tube-shaped drainage inducing members 51 may simply to lead out of the grommet 40. The plurality of tube-shaped drainage inducing members 51 may also come together at a single location partway along to form a single tube-shaped drainage inducing member 51.

Also, as shown in FIG. 5, if a tongue-shaped drainage inducing member 51 or a short tube-shaped drainage inducing member 51 is used, a collective drainage member 52 that collects the water drained from the drainage inducing members 51 in one place and drains the collected water may be provided on a lower end surface of the grommet 40.

Incidentally, in FIG. 5, the drain holes 20a to 20d are provided generally horizontal. However, if the inlet assembly 200 itself is arranged slanted gradually upward, the drain holes 20a to 20d may also be such that the back side slants downward to better promote drainage.

Also, even if the inlet assembly 200 itself is arranged horizontal, the drain holes 20a to 20d may open with the back side slanted downward to better promote drainage.

As described above, the inlet assembly according to this example embodiment is provided with the drain holes 20a to 20d. In addition, the drainage inducing members 51 are arranged on the edge portions on the back side of the drain holes 20a to 20d to better promote the drainage of water that has reached the drain holes 20a to 20d to the outside. As a result, water will not collect at the drain holes 20a to 20d, so water is able to be brought over to the side with the drainage inducing members 51.

As a result, it is possible to promote the drainage of water that has adhered to the inlet assembly 200 to the outside, and thus prevent a situation in which the connector 12 is unable to be detached from the inlet 2, and a situation in which the connector 12 is unable to be attached to the inlet 2, due to the water freezing in cold regions or in winter.

The example embodiments disclosed herein are in all respects merely examples and should in no way be construed as limiting. The scope of the invention is indicated not by the foregoing description but by the scope of the claims for patent, and is intended to include all modifications that are within the scope and meanings equivalent to the scope of the claims for patent.

The invention claimed is:

1. An inlet assembly provided in a vehicle in which a power storage device mounted inside is charged using an external power supply, comprising:
    an inlet to which a connector that is connected to the external power supply connects;
    an inlet base that secures the inlet to the vehicle; and
    a cylindrical guide wall that surrounds the inlet and guides the connector into connection with the inlet,
    wherein a drain hole is provided in the inlet base, and a drainage inducing member that promotes drainage is arranged on an edge portion of the drain hole, on a back side of the inlet base, the back side being a side opposite the side on which the inlet is provided.

2. The inlet assembly according to claim 1, wherein at least two of the drain holes are provided in the inlet base, a respective one of the drainage inducing members is provided for a respective one of the drain holes, and a collective drainage member that collects water drained from the drainage inducing members in a single location and that drains the water is provided.

3. The inlet assembly according to claim 2, wherein a grommet that covers a cable that is connected to the inlet is provided on the back side of the inlet base, and the collective drainage member is provided on the grommet.

* * * * *